(12) United States Patent
Yi et al.

(10) Patent No.: US 9,508,312 B2
(45) Date of Patent: Nov. 29, 2016

(54) MECHANISM FOR FACILITATING DYNAMIC COUNTER SYNCHRONIZATION AND PACKETIZATION IN HIGH-DEFINITION MULTIMEDIA INTERFACE AND MOBILE HIGH-DEFINITION LINK

(71) Applicant: Lattice Semiconductor Corporation, Portland, OR (US)

(72) Inventors: Ju Hwan Yi, Sunnyvale, CA (US); Wooseung Yang, Sunnyvale, CA (US); Myung Je Cho, Sunnyvale, CA (US); Hoon Choi, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 248 days.

(21) Appl. No.: 14/163,981

(22) Filed: Jan. 24, 2014

(65) Prior Publication Data

US 2015/0215058 A1 Jul. 30, 2015

(51) Int. Cl.
*H04J 3/06* (2006.01)
*G09G 5/00* (2006.01)
*H04N 21/43* (2011.01)
*H04N 21/4363* (2011.01)
*H04L 29/06* (2006.01)

(52) U.S. Cl.
CPC .............. *G09G 5/006* (2013.01); *G09G 5/003* (2013.01); *G09G 5/008* (2013.01); *G09G 2370/10* (2013.01); *G09G 2370/12* (2013.01); *H04L 63/0428* (2013.01); *H04N 21/4305* (2013.01); *H04N 21/43635* (2013.01)

(58) Field of Classification Search
None
See application file for complete search history.

(56) References Cited

U.S. PATENT DOCUMENTS

| | | | |
|---|---|---|---|
| 7,110,048 B2* | 9/2006 | Weiss | H04N 5/38 348/723 |
| 2008/0144553 A1* | 6/2008 | Shao | H04W 28/06 370/310 |
| 2008/0250294 A1* | 10/2008 | Ngo | H04L 1/007 714/752 |
| 2013/0230296 A1* | 9/2013 | Yun | G06F 21/606 386/230 |
| 2013/0279693 A1* | 10/2013 | Rothschild | H04N 21/43637 380/200 |

\* cited by examiner

*Primary Examiner* — Kwang B Yao
*Assistant Examiner* — Hardikkumar Patel
(74) *Attorney, Agent, or Firm* — Fenwick & West LLP (57) ABSTRACT

A mechanism for facilitating dynamic counter synchronization and packetization for data streams being communicated over communication devices is described. In one embodiment, a method includes detecting an audio/video (A/V) data stream being encrypted and/or decrypted using one or more high-bandwidth digital content protection (HDCP) engines, where the A/V data stream is communicated between a source device and a sink device. The method may further include dividing a video stream portion of the A/V data stream into a plurality of frames if the A/V data stream relates to a high-definition multimedia interface (HDMI), and synchronizing counter values with indicators within the plurality of frames.

17 Claims, 7 Drawing Sheets

MECHANISM FOR FACILITATING DYNAMIC COUNTER SYNCHRONIZATION AND PACKETIZATION IN HIGH-DEFINITION MULTIMEDIA INTERFACE AND MOBILE HIGH-DEFINITION LINK

TECHNICAL FIELD

Embodiments of the invention generally relate to media communication and, more particularly, to a mechanism for facilitating dynamic counter synchronization and packetization in high-definition multimedia interface (HDMI) and mobile high-definition link (MHL).

BACKGROUND

Conventional systems do not enable HDMI and MHL to be used with high-bandwidth digital content protection (HDCP), such as HDCP 2.2, as they are incapable of providing seamless conversion between the audio/video interfaces.

SUMMARY

A mechanism for facilitating dynamic counter synchronization and packetization for data streams being communicated over communication devices is described.

In one embodiment, a method includes detecting an audio/video (A/V) data stream being encrypted and/or decrypted using one or more high-bandwidth digital content protection (HDCP) engines, where the A/V data stream is communicated between a source device and a sink device. The method may further include dividing a video stream portion of the A/V data stream into a plurality of frames if the A/V data stream relates to a high-definition multimedia interface (HDMI), and synchronizing counter values with indicators within the plurality of frames.

In another embodiment, an apparatus performs a method according to any one or more of the operations mentioned above.

In another embodiment, a system includes one or more devices performing a method according to any one or more of the operations mentioned above.

In yet another embodiment, at least one machine-readable medium comprising a plurality of instructions that in response to being executed on a computing device, causes the computing device to carry out a method according to any one or more of the operations mentioned above.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments are directed to facilitating dynamic counter synchronization and seamless transmission of data streams relating to HDCP 2.2 over HDMI and/or MHL as well as offering novel performance and placement of packetization and depacketization within the data streams. For example, embodiments provides for enabling HDMI and MHL3 to use HDCP2.2 and facilitating seamless conversion and communication of data between them.

Figure 1A:
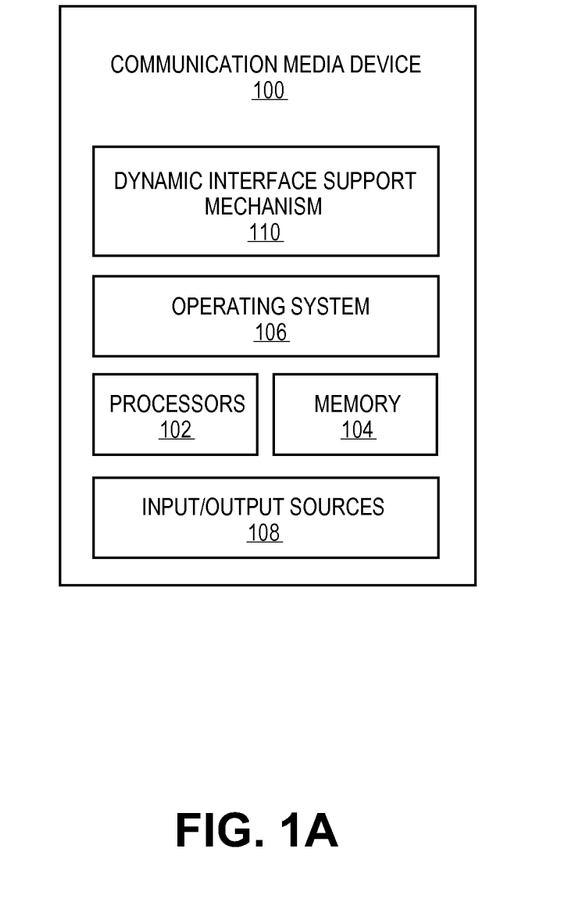
FIG. 1A illustrates a media communication device employing a dynamic interface support mechanism according to one embodiment.

FIG. 1A illustrates a media communication device 100 employing a dynamic interface support mechanism 110 according to one embodiment. Media communication device ("media device") 100 may include any number and type of media devices, such as a computing device (e.g., smartphones, tablet computers, laptop computers, etc.), a communication or telecommunication device (e.g., broadband headends, televisions, etc.), a network device, a source device (e.g., a transmitter), a sink device (e.g., a receiver), an intermediate device (e.g., an independent clock generator), etc. Media device 100 may include any number of components and/or modules that may be common to a variety of media devices (such as a sink device, a source device, etc.); however, throughout this document, in one embodiment and for brevity, clarity and ease of understanding, media device 100 may include and be referred to as a host device or host machine employing dynamic interface support mechanism ("interface mechanism") 110 and set to be in communication with any number and type of devices, such as one or more source devices and/or sink device and/or intermediate devices over a network (e.g., a broadcasting network, such a cable or satellite broadcasting network, a Wide Area Network ("WAN"), a Local Area Network ("LAN"), a Personal Area Network ("PAN"), a Metropolitan Area Network ("MAN"), a cloud-based network, an intranet, the Internet, a cloud-based network, proximity network (e.g., Bluetooth, etc.), etc., and a shared-channel network including a HDMI, a MHL, a DisplayPort, a Universal Serial Bus ("USB"), a Peripheral Component Interconnect ("PCI"), and an on-chip bus including Advanced Microcontroller Bus Architecture ("AMBA"), etc.

A source device refers to a transmitter or a transmitting device that is responsible for transmitting data (e.g., media audio and/or video data/content streams) to a sink device that refers to a receiver or a receiving device responsible for receiving the transmitted data over a communication network. Examples of a source device may include consumer electronics devices, such as a personal computer ("PC"), a mobile computing device (e.g., a tablet computer, a smartphone, etc.), an MP3 player, an audio equipment, a television, a radio, a Global Positioning System ("GPS") or navigation device, a digital camera, an audio/video recorder, a Blu-Ray player, a Digital Versatile Disk ("DVD") player, a Compact Disk ("CD") player, a Video Cassette Recorder ("VCR"), a camcorder, a docking station, a cable adapter, and a dongle, etc. Examples of a source device may further include a computing device, a data terminal, a machine (e.g., a facsimile machine, a telephone, etc.), a video camera, a broadcasting station (e.g., a television or radio station, a cable headend, etc.), a cable broadcasting head-end, a set-top box, a satellite, etc. A sink device may include one or more of the same examples of media devices as those listed for the source device. Similarly, an intermediate device may include one or more of the same media device as those listed for the source device or it may include a specialized clock generator to perform timestamp-less clock generation in one or more embodiments.

Media device 100 may include an operating system 106 serving as an interface between any hardware or physical resources of the source device 100 and a sink device or a user. Media device 100 may further include one or more processors 102, memory devices 104, network devices, drivers, or the like, as well as input/output ("I/O") sources 108, such as a touchscreen, a touch panel, a touch pad, a virtual or regular keyboard, a virtual or regular mouse, etc.

Embodiments provide interface mechanism 110 to facilitate extracting source clock timestamp at a sink device by counting the number of received audio/video samples allowing for clock generation without having the need for generating or delivering timestamp or any clock-related information over a channel, and allowing the channel system to be without a common channel clock for regenerating a target clock. Interface mechanism 110 further provides for a digital feedback loop for low resolution phased-lock loop or phase lock loop ("PLL") by using an interim clock reference to increase clock frequency and reduce clock jitter of the regenerated clock as well as to reduce hardware cost and complexity for implementing high resolution PLL.

Figure 1B:
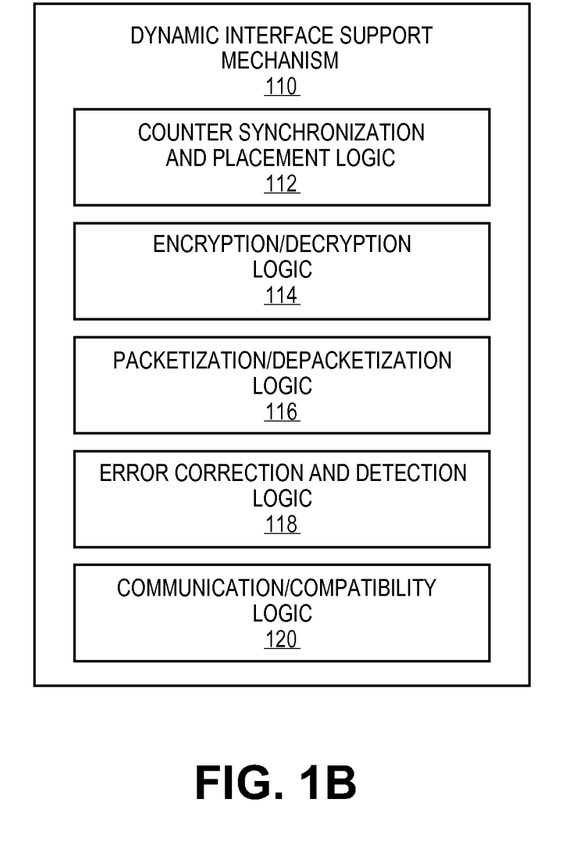
FIG. 1B illustrates a dynamic interface support mechanism according to one embodiment.

FIG. 1B illustrates a dynamic interface support mechanism 110 according to one embodiment. In the illustrated embodiment, interface mechanism 110 includes one or more components 112-118 to perform various tasks relating to facilitating dynamic interface support for novel and innovative counter synchronization and seamless transmission of data streams relating to HDCP over HDMI and/or MHL as well as for novel and innovative performance and placement of packetization/de-packetization within the data streams. In one embodiment, the one or more components include (but not limited to) counter synchronization and placement logic ("counter logic") 112, encryption/decryption logic ("E/D logic") 114, packetization/depacketization ("P/D logic") 116, error detection and correction logic ("EDC logic") 118, and communication/configuration ("C/C logic") 120.

For example and in one embodiment, counter logic 112 may facilitate novel and innovative counter synchronization for counters associated with each of data streams relating to HDMI and MHL. For example, as discussed in reference to FIGS. 2A-2C, a different counter synchronization may be adopted for a data stream relating to HDMI than the one for MHL. Similarly, E/D logic 114 and P/D logic 116 may perform their encryption/decryption and packetization/de-packetization tasks, respectively, for HDCP data streams being communicated over HDMI and/or MHL. EDC logic 118 may be used for detection and correction of any errors, such as those caused by out-of-sync situations relating to counter synchronization during transmission of an A/V data stream between a transmitter and a receiver. C/C logic 120 may be used facilitating seamless communication and compatibility between various differing media devices, protocols, techniques, technologies, standards, etc.

Throughout this document, any reference to "component", "logic", "processing logic", "module", "engine", "framework", etc., may include, by way of example, software, hardware, and/or any combination of software and hardware, such as firmware.

It is contemplated that any number and type of components may be added to and/or removed from dynamic interface support mechanism 110 to facilitate various embodiments including adding, removing, and/or enhancing certain features. For brevity, clarity, and ease of understanding of dynamic interface support mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2A:
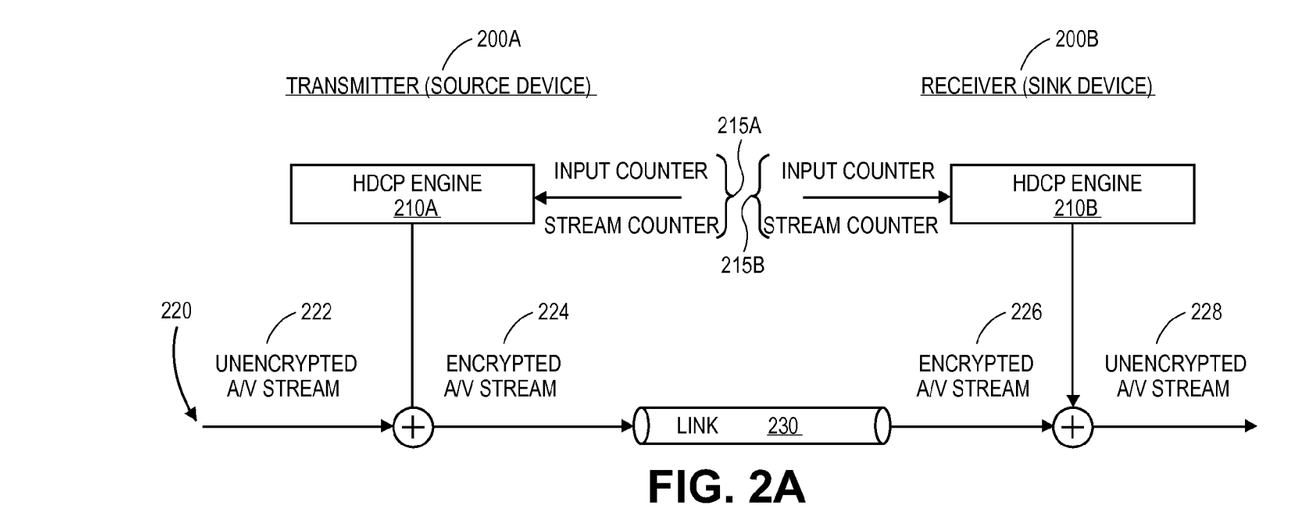
FIG. 2A illustrates a communication system between a transmitter and a receiver according to one embodiment.

FIG. 2A illustrates a communication system 200 between a transmitter 200A and a receiver 200B according to one embodiment. As illustrated, data stream 220 (e.g., audio/video ("A/V") media stream) may be communicated between transmitter side or transmitter ("source device" or simply "Tx") 200A and receiver side or receiver ("sink device" or simply "Rx") 200B over a link 230. Further, in the illustrated embodiment, a flow of HDCP (e.g., HDCP2.2) encryption and decryption is shown. For example, at transmitter 200A, unencrypted A/V data stream 222 (e.g., HDMI data stream) arrives and it is XOR'd with a cipher value coming from HDCP engine 210A and subsequently, it comes in as encrypted A/V stream 224. For an HDCP2.2 operation, a couple of counter values (or simply "counters") 215A are used, such as a data stream counter and an input counter. Counter values 215A are regarded as part of what is needed on the receiver side or at receiver 200B to decrypt encrypted A/V stream 224 as it goes over or through link 230 and reaches receiver 200B as encrypted A/V stream 226. Subsequently, encrypted A/V stream 226 is decrypted by HDCP engine 210B at receiver 200B and transforms into unencrypted A/V stream 228. For this operation to be successful, counters 215B at receiver 200B are expected to match counters 215A at transmitter 200A and this matching of counters 215A, 215B is referred to as counter synchronization.

Figure 2B:
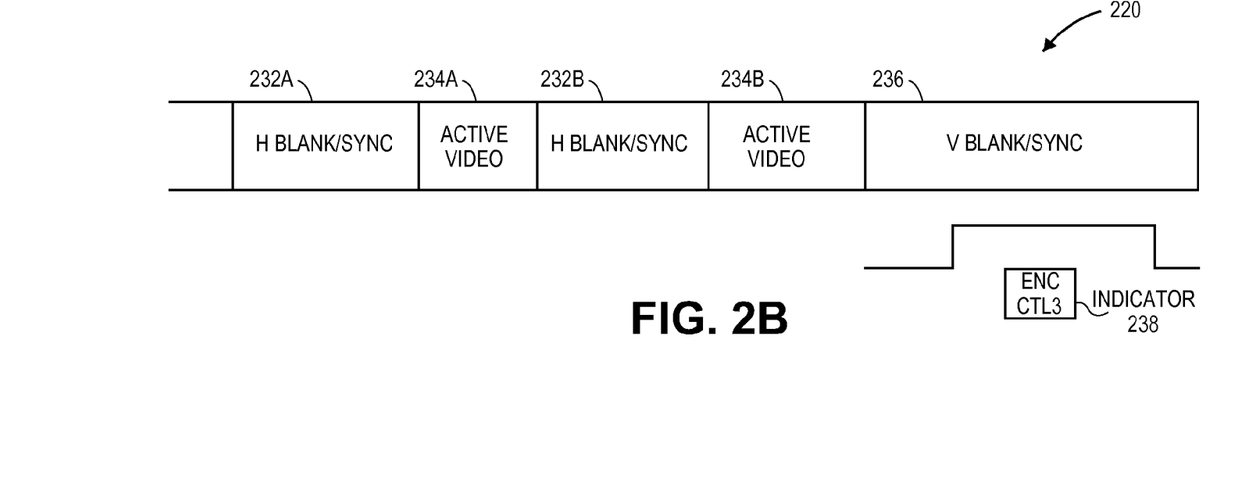
FIG. 2B illustrates a data stream according to one embodiment.

FIG. 2B illustrates a data stream 220 according to one embodiment. In one embodiment, data stream 220 may include an A/V stream (e.g., HDMI stream) such as that of FIG. 2A. In one embodiment, data stream 220 may include horizontal blank/synchronize ("H-blank/sync") 232A, 232B, active video 234A, 234B, vertical blank/synchronize ("V-blank/sync") 236, etc. Further, for example, each blank period 232A, 232B, 236, may include any number and type of data islands such as audio, information frames, or the like, where the audio/video parts and various data islands of data stream 220 may be encrypted during HDCP operations.

V-blank/sync period 236 of data stream 220 may include an indicator 238, such as encoder/control 3 ("ENC/CTL3"). This indicator 238 may indicate that, for example, the following video frame is encrypted content. HDCP engine 210B of FIG. 2A may check for indicator 238 at each frame boundary and if indicator 238 is detected, HDCP engine 210B may begin to start to generate cipher/decipher values (e.g., values XOR'd within data stream 220) for encryption/decryption. As will be further described with reference to FIG. 2D, in one embodiment, counter synchronization may be performed by sending counter values 215A, 215B over A/V data stream 220 from transmitter 200A to receiver 200B before encountering indicator 238 and this may be achieved without having to modify any part of HDMI data stream 220.

Figure 2C:
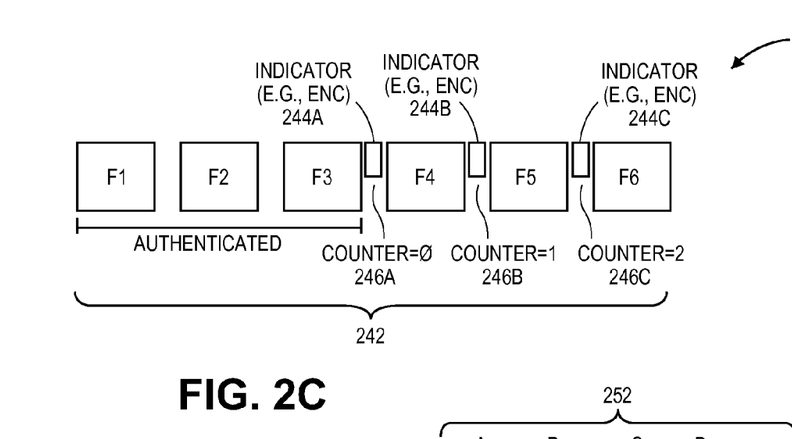
FIG. 2C illustrates counter synchronization relating to HDMI according to one embodiment.

FIG. 2C illustrates counter synchronization 240 relating to HDMI according to one embodiment. In the illustrated embodiment, instead of sending counters explicitly from transmitter to receiver, it is done implicitly. For example, each frame 242, such as F1, F2, F3, F4, F5 and F6, represents a video frame and that before HDCP engines 210A, 210B may communicate with each other and finish authentication and session key exchange, F1, F2 and F3 of frames 242 may not be encrypted. Upon authentication of F1, F2 and F3, however, HDCP engine 210A may start the encryption process and mark indicator 244A, 244B, 244C (e.g., ENC/CTL3 indicators) after F3 and between the remaining frames, F4, F5 and F6 of frames 242. For example, as illustrated, indicator 244A may be marked between frames F3 and F4, indicator 244B between frames F4 and F5, and indicator 244C between frames F5 and F6.

Furthermore, in one embodiment, instead of the conventional technique of sending counters explicitly; here, counters 0 246A, 1 246B and 2 246C are synchronized with indicators 244A, 244B and 244C, respectively. For example, upon authentication, indicator 244A resets the counter to 0 246A and subsequently, the counter values may increase as per predefined criteria, such as counter 0 246A becomes counter 1 246B at indicator 244B then it becomes counter 2 246C at indicator 244C. In other words, using this novel and innovative technique, transmitter 200A and receiver 200B may be kept synchronized in detecting indicators 246A-246C and keeping them synchronized with the corresponding counters 0-2 246A-246C.

For example, when noise breaks one of indicators 244A-244C in link 230, there may be a possible out-of sync experience, such as if the noise on link 230 breaks an ENC/CTL3 indicator, such as indicator 244A-244C, receiver 200B may not detect the broken indicator 244A-244C and its corresponding counter 246A-246C and may advance ahead of transmitter 200A. However, this situation may be detected and fixed using an error detection and correction technique, as facilitated by error detection and correction logic 118 of FIG. 1B, having the capability of receiver 200B to detect any number and type of out-of-sync situations. In some embodiments, this technique may use or be based on the error checking capability of data islands which is used for detecting errors caused by, for example, noise, but it may be used for out-of-sync situations. For example, in an out-of-sync situation, HDCP engine 210B at receiver 200B may start to use incorrect counters 246A-246C as well as incorrectly decipher A/V data stream 220 to have incorrect data in it. Given that the errors caused by an out-of-sync situation are continuous, where those caused by noise are sporadic, in this case, in one embodiment, a number of errors are checked for each frame of frames 242, a number of error detected frames in a given time, a total number of errors, etc., are detected to get to the actual factor that caused the out-of-sync error so it may then be corrected. Further, this error detection technique considers possible minimum number of data islands allowed in data stream 220 since the number of errors may be limited by the number of data islands in data stream 220. Accordingly, in one embodiment, as soon as receiver 200B detects an out-of-sync situation, it notifies transmitter 200A to restart the encryption.

Figure 2D:
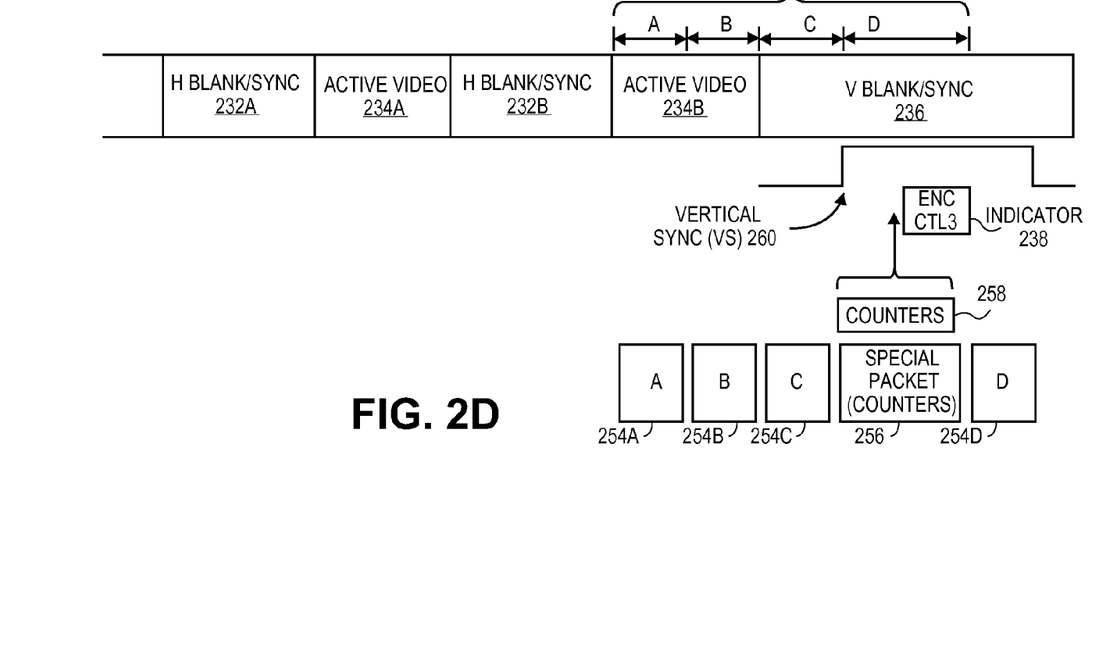
FIG. 2D illustrates counter synchronization relating to MHL according to one embodiment.

FIG. 2D illustrates counter synchronization 250 relating to MHL according to one embodiment. In case of MHL (e.g., MHL3), in one embodiment, a portion of encrypted A/V data stream 220 may be partitioned into pieces 252, such as portions of active video 234B and V-blank/sync 236 are partitioned into pieces or packets A-D 252 and correspondingly put into an MHL packet (e.g., MHL3 packet) as A 254A, B 254B, C 254C, and D 254D. In one embodiment, this MHL packet may convey the contents, including pieces A-D 254A-254D, to receiver 200B where the contents are then extracted from packet and proceed to HDCP engine 210B for decryption.

In one embodiment, in addition to pieces A-D 254A-254D, special packet 256 containing counters may be inserted into the MHL packet such that counters 258 may then be conveyed to packets 252 of data stream 220. For example and in one embodiment, special packet 256 having counters may be inserted between packet C 254C and packet D 254D to subsequently deliver or convey counters 258 to receiver 200B for the use in HDCP engine 210B as counters 215B. Being that special packet 256 is added as an extra or additional packet to packets A-D 254A-244D of the MHL packet, other packets A-D 254A-244D corresponding to packets 252 of A/V data stream 220 remain unchanged and intact. Special packet 256 is intelligently placed such that it is between the active edges of vertical sync (VS) 260, corresponding to the end of C and D of packets 252, and indicator 238 (e.g., ENC/CTL3 indicator) and correspondingly between C 254C and D 254D such as to give enough time to HDCP engine 210B to prepare to use counters 258 upon arrival or detection of indicator 238.

Additionally, a relatively wide allowed range (e.g., 512 cycles) of a location of special packet 256 ensures that none of the A/V pieces, such as C of packets 252, are broken into smaller pieces to meet the timing of special packet 256. Further, in one embodiment, receiver 200B may simply keep or hold counters 258 in special package 256 without having to use them until indicator 238 has arrived and thereafter, HDCP engine 210B may use counters 258 to update HDCP engine 210B, allowing synchronization between special packet 256 having counters and indicator 238 in A/V data stream 220. Since, in MHL3, merely one special packet 256 may be sent at every frame boundary, such as the area of active VS 260, receiver 200B may re-synchronize for itself at each frame boundary in case there is an out-of-synch error, eliminating the need for receiver 200B to inform transmitter 200A that it has encountered the out-of-sync situation.

Figure 3:
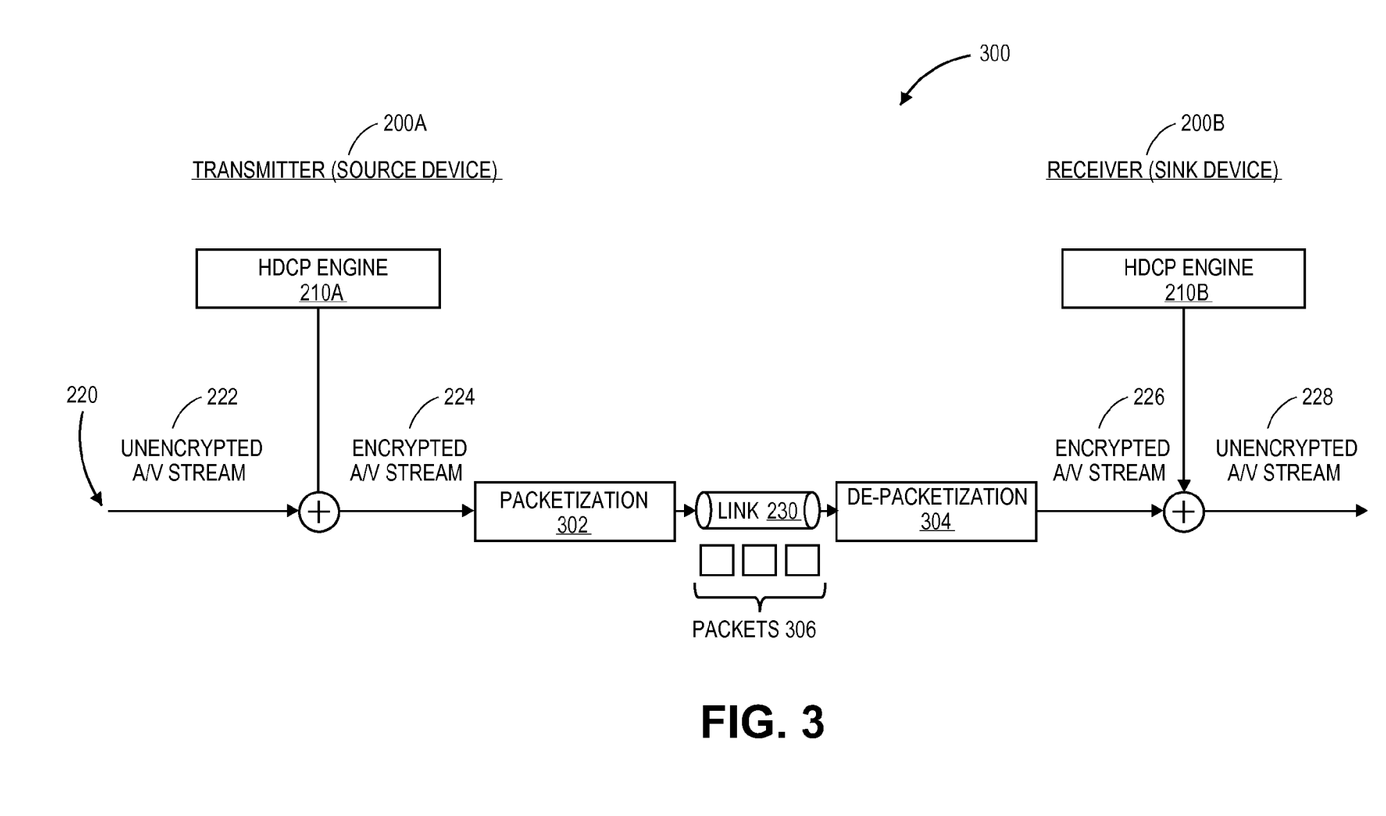
FIG. 3 illustrates component placement scheme for an MHL-based A/V data stream for HDCP operations according to one embodiment.

FIG. 3 illustrates component placement scheme 300 for an MHL-based A/V data stream 220 for HDCP operations according to one embodiment. In one embodiment, component placement scheme 300 in MHL (e.g., MHL3) for HDCP (e.g., HDCP2.2) operation is illustrated. In conventional techniques, encryption may be done after packets from unencrypted stream, such as the unencrypted A/V stream may be packetized for making packets and then the packets may be encrypted for generated encrypted packets. These packets may then arrive at a receiver where the HDCP engine for packets may decrypt the encrypted packets to generated unencrypted packets. The depacketization component may extract the A/V stream from the packets. This conventional scheme may be employed so one encryption scheme may cover various input sources.

In one embodiment, HDCP encryption may be performed by HDCP engine 210A prior to packetizing 302 of A/V data stream 220. For example, unencrypted stream 222 is encrypted by HDCP engine 210A into encrypted stream 224 prior to packetization to generate packets 306.

Similarly, at receiver 200B, already-packetized encrypted stream 226 is first obtained or extracted and then, decryption by HDCP engine 210B is performed to generate unencrypted data stream 228. In one embodiment, this novel and innovative technique facilitates the MHL3 packets to remain transparent in HDCP2.2 perspective, such as if the packetization sections 302 and 304 are removed from FIG. 3, the system may be identical as to that of FIG. 2A that is used for HDMI and thus it enables a seamless conversion between MHL3 and HDMI under HDCP2.2, which makes efficient and inexpensive, facilitating efficient implementation of a dual mode supporting both HDMI and MHL3 with HDCP2.2.

Figure 4:
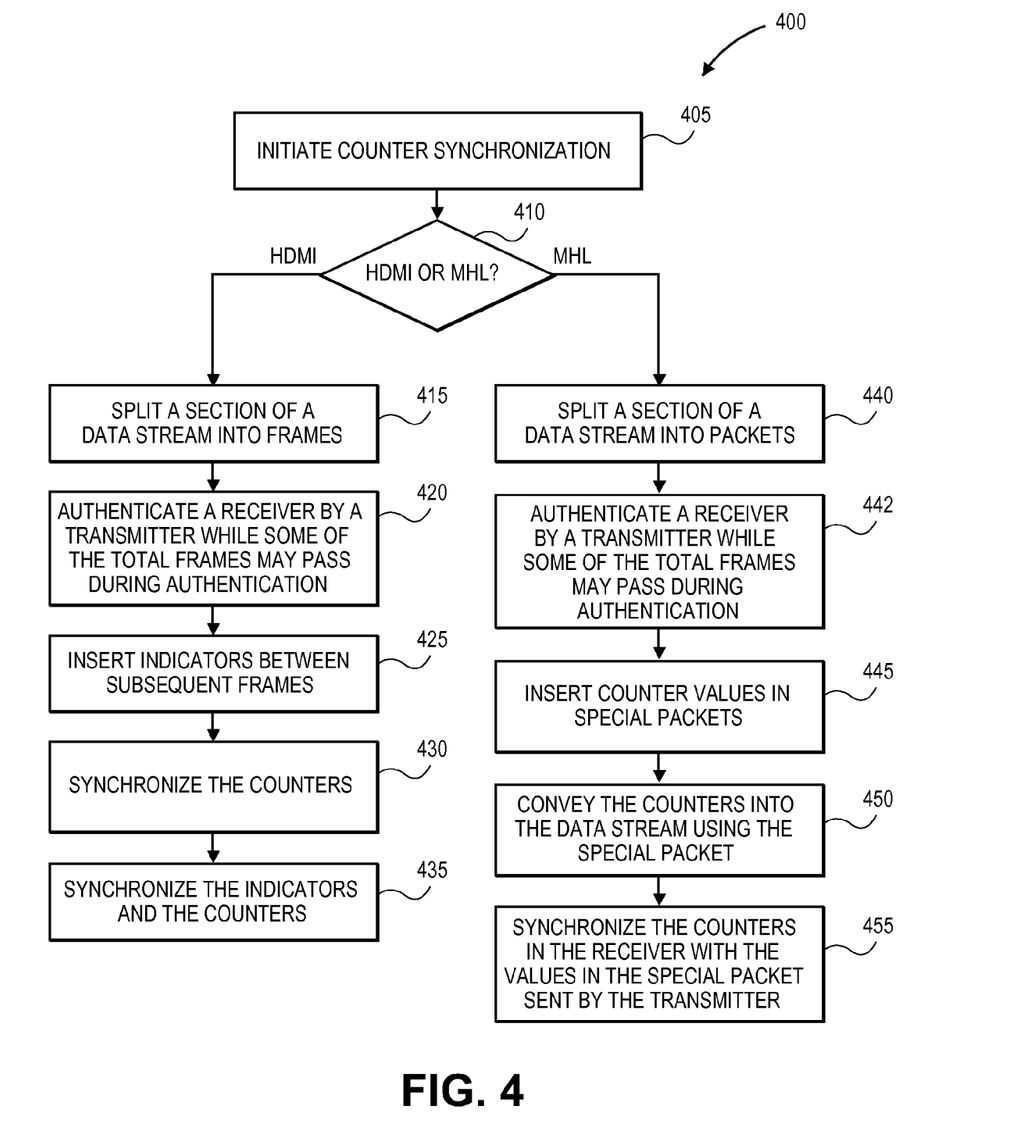
FIG. 4 illustrates a method for dynamic counter synchronization for HDMI and MHL with HDCP according to one embodiment.

FIG. 4 illustrates a method 400 for dynamic counter synchronization for HDMI and MHL with HDCP according to one embodiment. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by dynamic interface support mechanism 110 of FIG. 1.

Method 400 begins at block 405 with initiating of counter synchronization for an A/V data stream relating to HDMI and MHL (e.g., MHL3) with HDCP (e.g., HDCP2.2). At block 410, a determination is made to whether the data stream relates to HDMI or MHL. At block 415, if the data stream relates to HDMI, a section of the data stream, such as the video portion of the data stream, is split into any number of frames. At block 420, any number of frames of the total frames may pass, while a transmitter authenticates a receiver. At block 425, indicators (e.g., ENC indicators) may be inserted between the subsequent consecutive frames. At block 430, counters (e.g., 0, 1, 2, 3 . . . N) are to be synchronized and subsequently, at block 435, the counters are synchronized (e.g., implicitly) per the indicators.

Referring back to block 410, if the A/V data stream relates to MHL, a portion of the data stream may be split into pieces or packets at block 440. Like block 420, at block 442, the receive is authenticated by the transmitter, while any number of frames of the total frames may pass during the authentication process. At block 445, counter values are put into special packets. At block 450, the counters contained within the special packet are conveyed or delivered to the corresponding packet of the data stream. The special packet is placed before the indicator (e.g., ENC/CTL3 indicator). At block 455, the counters in the receiver are synchronized to the values in the special packet sent by the transmitter.

Figure 5:
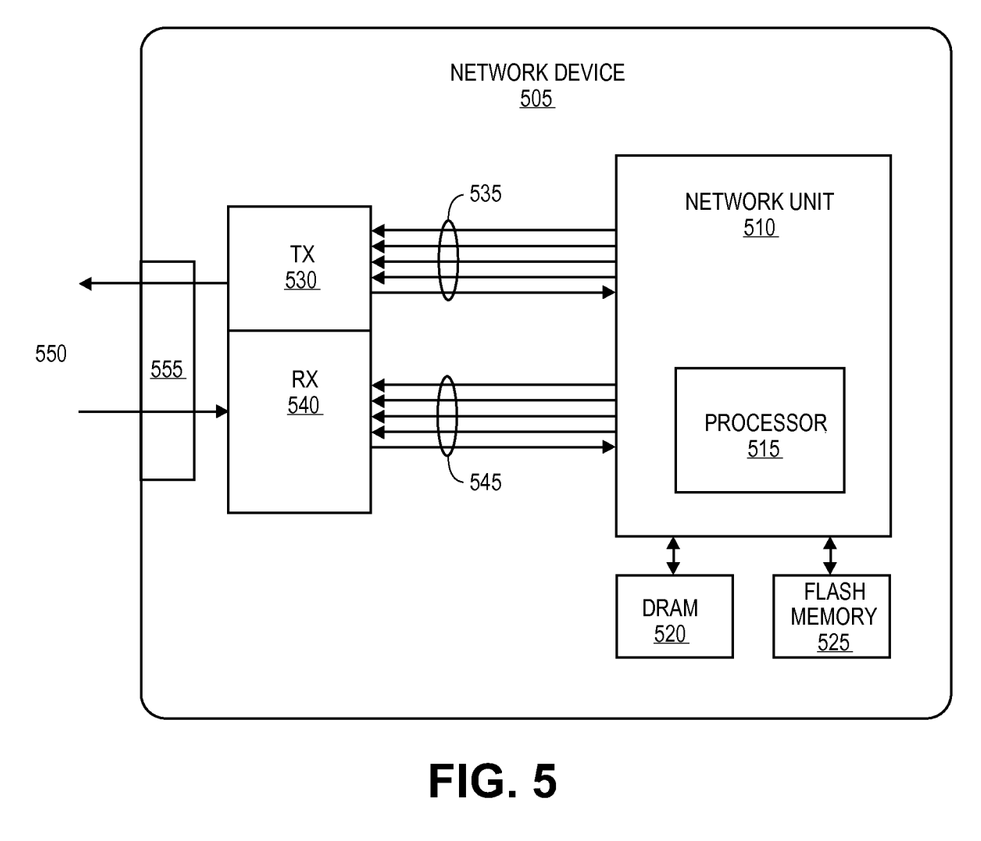
FIG. 5 illustrates a computing device capable of employing one or more embodiments.

FIG. 5 illustrates components of a network computer device 505 employing dynamic interface support mechanism 110 of FIG. 1 according to one embodiment. In this illustration, a network device 505 may be any device in a network, including, but not limited to, a computing device, a network computing system, a television, a cable set-top box, a radio, a Blu-ray player, a DVD player, a CD player, an amplifier, an audio/video receiver, a smartphone, a Personal Digital Assistant (PGA), a storage unit, a game console, or other media device. In some embodiments, the network device 505 includes a network unit 510 to provide network functions. The network functions include, but are not limited to, the generation, transfer, storage, and reception of media content streams. The network unit 510 may be implemented as a single system on a chip (SoC) or as multiple components.

In some embodiments, the network unit 510 includes a processor for the processing of data. The processing of data may include the generation of media data streams, the manipulation of media data streams in transfer or storage, and the decrypting and decoding of media data streams for usage. The network device may also include memory to support network operations, such as Dynamic Random Access Memory (DRAM) 520 or other similar memory and flash memory 525 or other nonvolatile memory. Network device 505 also may include a read only memory (ROM) and or other static storage device for storing static information and instructions used by processor 515.

A data storage device, such as a magnetic disk or optical disc and its corresponding drive, may also be coupled to network device 505 for storing information and instructions. Network device 505 may also be coupled to an input/output (I/O) bus via an I/O interface. A plurality of I/O devices may be coupled to I/O bus, including a display device, an input device (e.g., an alphanumeric input device and or a cursor control device). Network device 505 may include or be coupled to a communication device for accessing other computers (servers or clients) via external data network. The communication device may comprise a modem, a network interface card, or other well-known interface device, such as those used for coupling to Ethernet, token ring, or other types of networks.

Network device 505 may also include a transmitter 530 and/or a receiver 540 for transmission of data on the network or the reception of data from the network, respectively, via one or more network interfaces 555. Network Device 505 may be the same as the media communication device 100 of FIG. 1 employing dynamic interface support mechanism 110 of FIG. 1. The transmitter 530 or receiver 540 may be connected to a wired transmission cable, including, for example, a cable 550, such as an Ethernet cable including a coaxial cable, or to a wireless unit. In one embodiment and for example, Ethernet 550 may be similar to or the same as a shared channel. The transmitter 530 or receiver 540 may be coupled with one or more lines, such as lines 535 for data transmission and lines 545 for data reception, to the network unit 510 for data transfer and control signals. Additional connections may also be present. The network device 505 also may include numerous components for media operation of the device, which are not illustrated here.

Network device 505 may be interconnected in a client/server network system or a communication media network (such as satellite or cable broadcasting). A network may include a communication network, a telecommunication network, a Local Area Network (LAN), Wide Area Network (WAN), Metropolitan Area Network (MAN), a Personal Area Network (PAN), an intranet, the Internet, etc. It is contemplated that there may be any number of devices connected via the network. A device may transfer data streams, such as streaming media data, to other devices in the network system via a number of standard and non-standard protocols.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a DRAM enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   communication/compatibility logic configured to detect an audio/video (A/V) data stream being at least one of encrypted and decrypted using one or more high-bandwidth digital content protection (HDCP) engines, wherein the A/V data stream is communicated between a source device and a sink device; and
   counter synchronization and placement logic configured to:
      divide each frame in a video stream portion of the A/V data stream into a plurality of packets, and
      insert a special packet including counter values between an active edge of a vertical synchronization signal and an indicator indicating whether a subsequent frame is encrypted, wherein the special packet is inserted between consecutive packets of the plurality of packets.

2. The apparatus of claim 1, wherein the one or more HDCP engines include one or more HDCP 2.2 engines.

3. The apparatus of claim 2, wherein each counter value at a receiver is synchronized with a counter value at a transmitter based on the special packet.

4. The apparatus of claim 1, wherein the A/V data stream relates to a mobile high-definition link (MHL), wherein the MHL includes MHL3.

5. The apparatus of claim 1, wherein the counter synchronization and placement logic is further configured to deliver the special packet to a corresponding location with the A/V data stream, wherein the special packet is delivered between the active edge of the vertical synchronization signal and the indicator to synchronize counter values at the source device and counter values at the sink device.

6. The apparatus of claim 1, further comprising a display device to display the A/V data stream, wherein the A/V data stream is communicated between the source device and the sink device over a network,
   wherein the sink device comprises one or more of a television, a cinema display, a projector, a Digital Versatile Disk (DVD) player, a Blu-ray player, a computing device, a smartphone, a Personal Digital Assistant (PDA), a game console, a docking station, a cable adapter, and a dongle,
   wherein the source device comprises one or more of a network computing system, a cable set-top box, a cable headend, a satellite broadcasting system, a Blu-ray player, a DVD player, a smartphone, and a PDA,
   wherein the network comprises one or more of a broadcasting network, a Local Area Network (LAN), a Wide Area Network (WAN), a Personal Area Network (PAN), a Metropolitan Area Network (MAN), an intranet, an Internet, a cloud-based network, and a shared-channel network including a High-Definition Multimedia Interface (HDMI), a Mobile High-Definition Link (MHL), a DisplayPort, a Universal Serial Bus (USB), a Peripheral Component Interconnect (PCI), and an on-chip bus including Advanced Microcontroller Bus Architecture (AMBA).

7. A method comprising:

detecting an audio/video (A/V) data stream being at least one of encrypted and decrypted using one or more high-bandwidth digital content protection (HDCP) engines, wherein the A/V data stream is communicated between a source device and a sink device;

dividing each frame in a video stream portion of the A/V data stream into a plurality of packets; and inserting a special packet including counter values between an active edge of a vertical synchronization signal and an indicator indicating whether a subsequent frame is encrypted, wherein the special packet is inserted between consecutive packets of the plurality of packets.

8. The method of claim 7, wherein the one or more HDCP engines include one or more HDCP 2.2 engines.

9. The method of claim 8, wherein each counter value at a receiver is synchronized with a counter value at a transmitter based on the special packet.

10. The method of claim 7, wherein the A/V data stream relates to a mobile high-definition link (MHL), wherein the MHL includes MHL3.

11. The method of claim 7, further comprising delivering the special packet to a corresponding location with the A/V data stream, wherein the special packet is delivered between the active edge of the vertical synchronization signal and the indicator to synchronize counter values at the source device and counter values at the sink device.

12. The method of claim 10, further comprising displaying the A/V data stream at a display device, wherein the A/V data stream is communicated between the source device and the sink device over a network, wherein the sink device comprises one or more of a television, a cinema display, a projector, a Digital Versatile Disk (DVD) player, a Blu-ray player, a computing device, a smartphone, a Personal Digital Assistant (PDA), a game console, a docking station, a cable adapter, and a dongle, wherein the source device comprises one or more of a network computing system, a cable set-top box, a cable headend, a satellite broadcasting system, a Blu-ray player, a DVD player, a smartphone, and a PDA, wherein the network comprises one or more of a broadcasting network, a Local Area Network (LAN), a Wide Area Network (WAN), a Personal Area Network (PAN), a Metropolitan Area Network (MAN), an intranet, an Internet, a cloud-based network, and a shared-channel network including a High-Definition Multimedia Interface (HDMI), a Mobile High-Definition Link (MHL), a DisplayPort, a Universal Serial Bus (USB), a Peripheral Component Interconnect (PCI), and an on-chip bus including Advanced Microcontroller Bus Architecture (AMBA).

13. A non-transitory machine-readable medium having stored thereon instructions which when executed by a processor, cause the processor to perform one or more operations comprising:

detecting an audio/video (A/V) data stream being at least one of encrypted and decrypted using one or more high-bandwidth digital content protection (HDCP) engines, wherein the A/V data stream is communicated between a source device and a sink device;

dividing each frame in a video stream portion of the A/V data stream into a plurality of packets; and inserting a special packet including counter values between an active edge of a vertical synchronization signal and an indicator indicating whether a subsequent frame is encrypted, wherein the special packet is inserted between consecutive packets of the plurality of packets.

14. The non-transitory machine-readable medium of claim 13, wherein the one or more HDCP engines include one or more HDCP 2.2 engines.

15. The non-transitory machine-readable medium of claim 13, wherein each counter value at a receiver is synchronized with a counter value at a transmitter based on the special packet.

16. The non-transitory machine-readable medium of claim 13, wherein the A/V data stream relates to a mobile high-definition link (MHL), wherein the MHL includes MHL3.

17. The non-transitory machine-readable medium of claim 13, wherein the one or more operations further comprise delivering the special packet to a corresponding location with the A/V data stream, wherein the special packet is delivered between the active edge of the vertical synchronization signal and the indicator to synchronize counter values at the source device and counter values at the sink device.

* * * * *